United States Patent
Ichikawa

(10) Patent No.: US 8,658,730 B2
(45) Date of Patent: Feb. 25, 2014

(54) RUBBER COMPOSITION FOR TIRE, AND PNEUMATIC TIRE

(71) Applicant: Sumitomo Rubber Industries, Ltd., Kobe (JP)

(72) Inventor: Naoya Ichikawa, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 3 days.

(21) Appl. No.: 13/776,126

(22) Filed: Feb. 25, 2013

(65) Prior Publication Data

US 2014/0005319 A1    Jan. 2, 2014

(30) Foreign Application Priority Data

Jun. 27, 2012    (JP) ................................. 2012-144520

(51) Int. Cl.
| | |
|---|---|
| *C08K 3/04* | (2006.01) |
| *C08K 3/06* | (2006.01) |
| *B60C 1/00* | (2006.01) |
| *C08L 7/00* | (2006.01) |
| *C08F 8/34* | (2006.01) |
| *C08F 36/08* | (2006.01) |

(52) U.S. Cl.
USPC ......... 524/495; 524/575.5; 152/564; 526/335

(58) Field of Classification Search
USPC ................. 524/495, 575.5; 152/564; 526/335
See application file for complete search history.

(56) References Cited

U.S. PATENT DOCUMENTS

2011/0253285 A1* 10/2011 Ichikawa et al. .............. 152/564

FOREIGN PATENT DOCUMENTS

| JP | 2004-59803 A | | 2/2004 | |
|---|---|---|---|---|
| JP | 2007-131730 A | | 5/2007 | |
| JP | 2007-131730 A | * | 5/2007 | ............. C08L 21/00 |
| JP | 2007131730 A | * | 5/2007 | ............. C08L 21/00 |

* cited by examiner

*Primary Examiner* — Ling Choi
*Assistant Examiner* — Ronald Grinsted
(74) *Attorney, Agent, or Firm* — Birch, Stewart, Kolasch & Birch, LLP

(57) ABSTRACT

The invention aims to provide a rubber composition for a tire which achieves a balanced improvement in the abrasion resistance under both low and high severity abrasion conditions, low heat build-up properties, and chipping resistance. The invention relates to a rubber composition for a tire, including: a rubber component containing 60% by mass or more of a natural rubber component; and a carbon black having a cetyltrimethylammonium bromide (CTAB) specific surface area of 140-160 $m^2/g$, a ratio (CTAB/IA) of the cetyltrimethylammonium bromide specific surface area to an iodine adsorption number (IA) of 0.85-1 $m^2/g$, and a ratio ($\Delta D50/Dst$) of a half width ($\Delta D50$) of Stokes' diameter distribution of aggregates to a Stokes' diameter (Dst) of aggregates, as determined by a centrifugal sedimentation method, of 0.9-0.99, the natural rubber component containing 20% by mass or more of highly purified natural rubber per 100% by mass of the natural rubber component.

6 Claims, No Drawings

RUBBER COMPOSITION FOR TIRE, AND PNEUMATIC TIRE

TECHNICAL FIELD

The present invention relates to a rubber composition for a tire, and also relates to a pneumatic tire and a heavy duty tire each formed from the rubber composition.

BACKGROUND ART

Conventionally, abrasion resistance has been considered to be important for heavy duty tires used for trucks, buses, and the like. Meanwhile, in heavy-truck transportation in Japan nowadays, the conditions in which tires are used are becoming less severe because of regulations of overloading, highway expansion, speed limit on highways, vehicle speed management using digital tachometers, and the like. Thus, greater importance is now also placed on the abrasion resistance under low severity abrasion conditions (conditions in which slip between tires and the road surface is less likely to occur, such as running at a constant speed on highways).

With respect to the abrasion resistance under low severity abrasion conditions, adhesive wear greatly contributes to the abrasion. Thus, it is considered to be advantageous to use natural rubber or styrene butadiene rubber rather than butadiene rubber. However, since tires are also, as a matter of course, required to have abrasion resistance under high severity abrasion conditions (conditions in which slip between tires and the road surface frequently occurs when starting or braking), for example, it is necessary to combine butadiene rubber. Thus, it is difficult to improve abrasion resistance under both of the conditions in a balanced manner. Furthermore, energy saving by reducing heat build-up of tires, improvement of chipping resistance, and the like are also demanded. Therefore, it is also difficult to improve these properties at the same time.

Patent Literature 1 discloses a technique of mixing a specific carbon black with butadiene rubber to enhance abrasion resistance while maintaining low heat build-up properties as well as fatigue resistance. However, the technique cannot sufficiently improve some properties such as abrasion resistance under low severity abrasion conditions. Patent Literature 2 discloses a technique of mixing a specific carbon black to enhance chipping resistance and abrasion resistance while maintaining low heat build-up properties. The technique, however, still has room for improvement in terms of low heat build-up properties and the like.

CITATION LIST

Patent Literature

Patent Literature 1: JP 2004-59803 A
Patent Literature 2: JP 2007-131730 A

SUMMARY OF INVENTION

Technical Problem

The present invention aims to solve the above problem and to provide a rubber composition for a tire which achieves a balanced improvement in the abrasion resistance under both low severity abrasion conditions and high severity abrasion conditions, low heat build-up properties, and chipping resistance, and also provide a pneumatic tire and a heavy duty tire each formed from the rubber composition.

Solution to Problem

The present invention relates to a rubber composition for a tire, including: a rubber component containing 60% by mass or more of a natural rubber component; and a carbon black having a cetyltrimethylammonium bromide (CTAB) specific surface area of 140 to 160 $m^2/g$, a ratio (CTAB/IA) of the cetyltrimethylammonium bromide specific surface area to an iodine adsorption number (IA) of 0.85 to 1 $m^2/g$, and a ratio ($\Delta D50/Dst$) of a half width ($\Delta D50$) of Stokes' diameter distribution of aggregates to a Stokes' diameter (Dst) of aggregates, as determined by a centrifugal sedimentation method, of 0.9 to 0.99, the natural rubber component containing 20% by mass or more of highly purified natural rubber per 100% by mass of the natural rubber component.

The rubber composition preferably contains sulfur in an amount of 0.6 to 1 part by mass per 100 parts by mass of the rubber component.

The highly purified natural rubber preferably has a phosphorus content of 200 ppm or less and a nitrogen content of 0.3% by mass or less.

The carbon black is preferably contained in an amount of 40 to 60 parts by mass per 100 parts by mass of the rubber component.

The present invention also relates to a pneumatic tire and a heavy duty tire each including a tire component formed from the rubber composition.

Advantageous Effects of Invention

The rubber composition for a tire of the present invention includes a predetermined amount of highly purified natural rubber and a specific carbon black, and thereby achieves a balanced improvement in the abrasion resistance under both low and high severity abrasion conditions, low heat build-up properties, and chipping resistance.

DESCRIPTION OF EMBODIMENTS

The rubber composition for a tire of the present invention includes a rubber component containing 60% by mass or more of a natural rubber component; and a carbon black (hereinafter, also referred to as "the specific carbon black") having a cetyltrimethylammonium bromide (CTAB) specific surface area of 140 to 160 $m^2/g$, a ratio (CTAB/IA) of the cetyltrimethylammonium bromide specific surface area to an iodine adsorption number (IA) of 0.85 to 1 $m^2/g$, and a ratio ($\Delta D50/Dst$) of a half width ($\Delta D50$) of Stokes' diameter distribution of aggregates to a Stokes' diameter (Dst) of aggregates, as determined by a centrifugal sedimentation method, of 0.9 to 0.99, the natural rubber component containing 20% by mass or more of highly purified natural rubber per 100% by mass of the natural rubber component.

Highly purified natural rubber with small contents of phosphorus, nitrogen, and the like enables to improve low heat build-up properties. However, it also causes a problem of reduction in rubber strength, leading to reduction in performances such as abrasion resistance and chipping resistance. Hence, if highly purified natural rubber is used instead in a rubber component, performances such as abrasion resistance are generally reduced though an improvement in low heat build-up properties is achieved. In the present invention, contrary to such an expectation, by substituting highly purified natural rubber for the rubber component of a compounded rubber which contains the specific carbon black, it is possible to improve low heat build-up properties while allowing improvement of the abrasion resistance under both low and high severity abrasion conditions and chipping resistance. Therefore, these properties can be improved synergistically at the same time.

In the present invention, highly purified natural rubber is used as the natural rubber component. The highly purified natural rubber may be, for example, a modified natural rubber having a phosphorus content of 200 ppm or less.

In the highly purified natural rubber, if the phosphorus content is more than 200 ppm, the effects of improving the abrasion resistance under both of the aforementioned conditions, low heat build-up properties, and chipping resistance may be insufficiently obtained. In addition, the resulting unvulcanized rubber composition tends to have higher Mooney viscosity and therefore poor processability. The phosphorus content is preferably 150 ppm or less, and more preferably 130 ppm or less. The lower limit is not particularly limited, and the lower the phosphorus content is, the better. Here, the phosphorus content can be measured by a conventional method such as ICP optical emission spectrometry. The phosphorus is derived from phospholipids (phosphorous compounds).

The highly purified natural rubber preferably has a nitrogen content of 0.3% by mass or less, and more preferably 0.15% by mass or less. If the nitrogen content is more than 0.3% by mass, the Mooney viscosity tends to increase during storage, leading to poor processability. In addition, low heat build-up properties also tend to deteriorate. The lower limit is not particularly limited, and the lower the nitrogen content is, the better. The nitrogen content can be measured by a conventional method such as Kjeldahl method. The nitrogen is derived from proteins.

The highly purified natural rubber preferably has a gel content of 20% by mass or less, more preferably 10% by mass or less, and further preferably 7% by mass or less. If the gel content is more than 20% by mass, processability and low heat build-up properties tend to deteriorate. The lower limit is not particularly limited, and the lower the gel content is, the better. The gel content herein means a value determined as an amount of matter insoluble in toluene which is a non-polar solvent. Hereinafter, it is also referred to simply as "gel fraction". The gel fraction can be measured as follows: first, a natural rubber sample is immersed in dehydrated toluene and left for one week in a dark place protected from light. Then, the toluene solution is centrifuged at $1.3 \times 10^5$ rpm for 30 minutes so as to separate an insoluble gel fraction from a toluene-soluble fraction. The insoluble gel fraction is then mixed with methanol to be solidified, and dried. The gel content can be determined from the ratio of the mass of the dried gel fraction to the initial mass of the sample.

The highly purified natural rubber preferably contains substantially no phospholipids. Here, the phrase "contains substantially no phospholipids" means that no phospholipid peak is present in a range of −3 to 1 ppm in $^{31}$P-NMR measurement of an extract obtained by chloroform extraction from a natural rubber sample. The phosphorus peak present in a range of −3 to 1 ppm refers to a peak attributed to a phosphate ester structure of the "phospho" of phospholipids.

The highly purified natural rubber can be prepared by the method disclosed in JP 2010-138359 A, for example. Specifically, natural rubber latex is saponified with alkali and then coagulated. The resultant coagulated rubber is washed and dried to provide highly purified natural rubber. Saponification can be carried out by adding alkali and optionally a surfactant to natural rubber latex and allowing the mixture to stand still at a predetermined temperature for a certain period. If necessary, stirring or the like may be performed. According to the method, since phosphorous compounds separated by the saponification can be removed by washing, the phosphorus content can be reduced by washing the rubber until the phosphorus content falls to a desired level. Also, the saponification causes degradation of proteins, and therefore the nitrogen content can be reduced to a desired level.

Examples of the natural rubber latex include conventionally known latexes such as raw latex, purified latex, and high ammonia latex. Examples of the alkali used in the saponification include sodium hydroxide, potassium hydroxide, calcium hydroxide, and amine compounds. In particular, sodium hydroxide and potassium hydroxide are preferred. Examples of the surfactant include conventionally known anionic surfactants, nonionic surfactant, and amphoteric surfactants. Among these, anionic surfactants are preferred, and sulphonate anionic surfactants are more preferred.

In the saponification, the amount of alkali can be set appropriately. Preferably, the amount is 0.1 to 10 parts by mass per 100 parts by mass of the solids in natural rubber latex. The amount of the surfactant is preferably 0.01 to 6.0 parts by mass per 100 parts by mass of the solids in natural rubber latex. Here, the temperature and time of the saponification may also be set appropriately and are, in general, approximately at 20 to 70° C. for 1 to 72 hours.

After the saponification, the saponified latex is coagulated, and the coagulated rubber is optionally broken up, followed by washing. The coagulation may be performed by, for example, adding an acid such as formic acid to latex to adjust pH, and optionally adding a polymeric coagulant. The washing may be performed by, for example, diluting and washing the rubber fraction with water, centrifuging it, and then taking out the rubber fraction. Before the centrifugation, for example, the rubber fraction may be diluted with water so that the rubber content in the natural rubber latex is adjusted to 5% to 40% by mass, preferably 10% to 30% by mass. Then, centrifugation may be performed at 5000 to 10000 rpm for 1 to 60 minutes. The washing can be repeated until the phosphorus content falls to a desired level. After the washing, the rubber fraction is dried to provide the highly purified natural rubber.

Examples of those usable as the natural rubber component other than highly purified natural rubber include, but are not particularly limited, natural rubber (NR, unmodified) generally used in the tire industry, such as SIR20, RSS#3, and TSR20.

In the rubber composition of the present invention, the rubber component contains 60% by mass or more of, and preferably 70% by mass or more of the natural rubber component per 100% by mass of the rubber component. If the amount of the natural rubber component is less than 60% by mass, the abrasion resistance under low severity abrasion conditions tends to be reduced. The upper limit of the amount of the natural rubber component is not particularly limited, and may be 100% by mass although it is preferably 95% by mass or less, and more preferably 90% by mass or less. If the amount of the natural rubber component is more than 95% by mass, the abrasion resistance under high severity abrasion conditions may be reduced.

The natural rubber component contains 20% by mass or more, preferably 30% by mass or more, more preferably 70% by mass or more, and especially preferably 100% by mass, of highly purified natural rubber per 100% by mass of the natural rubber component. If the amount of highly purified natural rubber is less than 20% by mass, the abrasion resistance under both of the aforementioned conditions, low heat build-up properties, and chipping resistance may not be improved sufficiently.

Examples of those usable as the rubber component other than the natural rubber component include diene synthetic rubbers such as isoprene rubber (IR), butadiene rubber (BR), styrene butadiene rubber (SBR), styrene isoprene butadiene rubber (SIBR), ethylene propylene diene rubber (EPDM), chloroprene rubber (CR), and acrylonitrile butadiene rubber (NBR). Among these, BR is preferred because it allows good abrasion resistance under both of the aforementioned conditions, low heat build-up properties, and chipping resistance.

The BR is not particularly limited, and examples thereof include BR with high cis content such as BR1220 produced by Zeon Corporation, and BR130B and BR150B produced by Ube industries, Ltd., and BR containing syndiotactic polybutadiene crystals such as VCR412 and VCR617 produced by Ube industries, Ltd. The BR preferably has a cis content of 85% by mass or more, from the viewpoint of low heat build-up properties and abrasion resistance.

The BR content is preferably 5% by mass or more, and more preferably 10% by mass or more, per 100% by mass of the rubber component. If the BR content is less than 5% by mass, the abrasion resistance under high severity abrasion conditions tends to be reduced. The BR content is preferably 40% by mass or less, and more preferably 30% by mass or less, per 100% by mass of the rubber component. If the BR content is more than 40% by mass, the abrasion resistance under low severity abrasion conditions tends to be reduced.

The total content of the natural rubber component and BR is preferably 80% by mass or more, and more preferably 100% by mass, per 100% by mass of the rubber component. If the total content is in the range, the abrasion resistance under both of the aforementioned conditions, low heat build-up properties, and chipping resistance can be improved sufficiently.

The specific carbon black has a cetyltrimethylammonium bromide (CTAB) specific surface area of 140 $m^2/g$ or greater, preferably 145 $m^2/g$ or greater. If the CTAB specific surface area is smaller than 140 $m^2/g$, the effect of improving abrasion resistance may be insufficient. The specific carbon black also has a CTAB specific surface area of 160 $m^2/g$ or smaller, preferably 155 $m^2/g$ or smaller. If the CTAB specific surface area is greater than 160 $m^2/g$, sufficient low heat build-up properties may not be obtained.

Here, the cetyltrimethylammonium bromide specific surface area can be measured in accordance with JIS K6217-3: 2001.

The specific carbon black preferably has an iodine adsorption number (IA) of 140 mg/g or greater, and more preferably 145 mg/g or greater. If the IA is smaller than 140 mg/g, the effect of improving abrasion resistance tends to be insufficient. The specific carbon black also preferably has an IA of 170 mg/g or smaller, and more preferably 165 mg/g or smaller. If the IA is greater than 170 mg/g, low heat build-up properties tend to deteriorate.

Here, the iodine adsorption number of carbon black can be measured in accordance with JIS K 6217-1:2001.

The specific carbon black has a ratio (CTAB/IA) of the cetyltrimethylammonium bromide specific surface area to the iodine adsorption number of 0.85 $m^2/mg$ or greater, preferably 0.87 $m^2/mg$ or greater. If the CTAB/IA is smaller than 0.85 $m^2/mg$, the effects of improving the abrasion resistance under both of the aforementioned conditions and low heat build-up properties may be insufficient. The specific carbon black also has a CTAB/IA of 1 $m^2/mg$ or smaller, preferably 0.95 $m^2/mg$ or smaller. If the CTAB/IA is greater than 1 $m^2/mg$, the effects of improving the abrasion resistance under both of the conditions tend to be insufficient, and fatigue resistance tends to be reduced.

The specific carbon black preferably has a Stokes' diameter (Dst) of aggregates determined by a centrifugal sedimentation method of 50 nm or greater, and more preferably 55 nm or greater. If the Dst is smaller than 55 nm, low heat build-up properties and processability tend to deteriorate. The specific carbon black also preferably has a Dst of 70 nm or smaller, and more preferably 65 nm or smaller. If the Dst is greater than 70 nm, abrasion resistance tends to be reduced.

The specific carbon black preferably has a half width ($\Delta D50$) of Stokes' diameter distribution of aggregates determined by a centrifugal sedimentation method of 40 nm or greater, and more preferably 45 nm or greater. If the $\Delta D50$ is smaller than 40 nm, low heat build-up properties and processability tend to deteriorate. The specific carbon black also preferably has a $\Delta D50$ of 65 nm or smaller, and more preferably 63 nm or smaller. If the $\Delta D50$ is greater than 65 nm, abrasion resistance tends to be reduced.

The specific carbon black has a ratio ($\Delta D50/Dst$) of $\Delta D50$ to Dst determined by a centrifugal sedimentation method of 0.9 or greater, preferably 0.92 or greater. If the $\Delta D50/Dst$ is smaller than 0.9, the effect of improving the abrasion resistance under low severity abrasion conditions tends to be insufficient. The specific carbon black also has a $\Delta D50/Dst$ of 0.99 or smaller, preferably 0.97 or smaller. If the $\Delta D50/Dst$ is greater than 0.99, the abrasion resistance under high severity abrasion conditions tends to be reduced.

Here, the $\Delta D50$ and Dst of the specific carbon black determined by a centrifugal sedimentation method can be measured as follows.

First, the specific carbon black is mixed with a 20% by volume aqueous ethanol solution containing a small amount of a surfactant, and sufficiently dispersed by sonication to form a dispersion. Next, 13 ml of distilled water as a spin liquid is added to a rotating disk of which the rotation rate is set at 8000 rpm. Then, 0.5 ml of the dispersion is added to the disk and at the same time, a recorder is activated so as to optically measure the amount of primary aggregates (or aggregates) of the carbon black passing through a certain point near the periphery of the rotating disk and thereby record a continuous absorbance versus time curve. Then, Stokes' diameters are calculated based on the sedimentation times, whereby a Stokes' diameter distribution curve is prepared. In the distribution curve, the Dst means a Stokes' diameter corresponding to the maximum absorbance (maximum frequency) in the distribution curve. The $\Delta D50$ means an absolute value of the difference between two Stokes' diameters each corresponding to a frequency of 50% of the maximum frequency in the distribution curve.

The specific carbon black preferably has a light transmittance of toluene extract of 80% or higher, and more preferably 85% or higher. If the light transmittance of toluene extract is lower than 80%, the carbon black formed tends to be unstable, thereby leading to reduced abrasion resistance. The specific carbon black also preferably has a light transmittance of toluene extract of 110% or lower, and more preferably 100% or lower. If the light transmittance of toluene extract is higher than 110%, the carbon black tends to have reduced surface activity leading to reduced abrasion resistance.

Here, the light transmittance of toluene extract can be measured in accordance with JIS K6218-4:2011 "Carbon black for rubber industry—Secondary characteristics—Part 4: Determination of light transmittance of toluene extract".

The specific carbon black can be prepared by a usual method for preparing carbon black. For example, a carbon black which satisfies the above requirements can be prepared by a furnace method or the like with appropriately adjusted factors including the introduction amount of materials, the introduction amount of combustion air, the oxygen content in the combustion air, the reaction temperature, and the reaction time. Specifically, the carbon black can be prepared by a usual furnace method under the following conditions: introduction amount of materials (introduction amount of material oil): 1300 to 1700 kg/h, introduction amount of combustion air: 5300 to 6000 $Nm^3/h$, oxygen content in combustion air (concentration of remaining oxygen at material oil injection point): 7% to 11%, reaction temperature (combustion air temperature): 620 to 660° C., and reaction time (reaction residence time): 2 to 6 ms, all of which factors are appropriately adjusted in the respective ranges. Also, commercially available products satisfying the above requirements can be used.

The content of the specific carbon black is preferably 40 parts by mass or more, and more preferably 45 parts by mass or more, per 100 parts by mass of the rubber component. If the content is less than 40 parts by mass, the effect of improving abrasion resistance tends to be insufficient. The content of the specific carbon black is also preferably 60 parts by mass or less, and more preferably 55 parts by mass or less, per 100 parts by mass of the rubber component. If the content is more than 60 parts by mass, low heat build-up properties and fatigue resistance tend to deteriorate.

The rubber composition of the present invention may preferably contain sulfur as a vulcanizing agent. The sulfur is not particularly limited and may be one generally used in the tire industry. Examples thereof include powder sulfur, precipitated sulfur, colloidal sulfur, insoluble sulfur, and highly dispersible sulfur. Insoluble sulfur can be suitably used.

The sulfur content is preferably 0.6 parts by mass or more, and more preferably 0.7 parts by mass or more, per 100 parts by mass of the rubber component. If the sulfur content is less than 0.6 parts by mass, low heat build-up properties tend to deteriorate. The sulfur content is also preferably 1.0 part by mass or less, and more preferably 0.9 parts by mass or less, per 100 parts by mass of the rubber component. If the content is more than 1.0 part by mass, the low severity abrasion resistance tends to be reduced. Here, in the case of using sulfur vulcanizing agents containing other components (e.g. insoluble sulfur), the sulfur content means the amount of pure sulfur, and does not include the amount of other components such as oil.

The rubber composition of the present invention may appropriately contain additives generally used for the preparation of rubber compositions, such as a reinforcing agent such as silica, a softener such as wax, an antioxidant, stearic acid, zinc oxide, and a vulcanization accelerator, in addition to the above materials.

The rubber composition of the present invention can be prepared by a usual method. Specifically, for example, the above materials may be kneaded using a Banbury mixer, a kneader, an open roll mill, or the like, and then vulcanized to prepare a rubber composition.

The rubber composition of the present invention can be used for various tire components. Being excellent in the abrasion resistance under both of the aforementioned conditions, low heat build-up properties, and chipping resistance, the rubber composition of the present invention can be suitably used in treads, and more suitably in treads for heavy duty tires for buses, trucks, and the like.

The tire of the present invention can be prepared from the above rubber composition by a usual method. Specifically, before vulcanization, the rubber composition containing the additives as needed is extruded and processed according to the shape of a tire component such as a tread, and molded in a usual manner using a tire building machine so as to form an unvulcanized tire. Then, the unvulcanized tire is heated and pressurized in a vulcanizer to form a tire.

The pneumatic tire of the present invention can be suitably used as a heavy duty tire particularly for buses, trucks, and the like.

EXAMPLES

The present invention will be more specifically described based on, but not limited to, examples.

The chemical agents used in Preparations are listed below. Here, the chemical agents were purified by usual methods, if necessary.

Natural rubber latex: field latex available from Muhibbah Lateks Sdn. Bhd.

Surfactant: Emal-E27C (sodium polyoxyethylene lauryl ether sulfate) produced by Kao Corporation NaOH: NaOH produced by Wako Pure Chemical Industries, Ltd.

Polymeric coagulant: ARONFLOC C 312 (strong cationic polymeric coagulant, polymethacrylate-type) produced by MT AquaPolymer, Inc.

(Preparation of Saponified Natural Rubber)

Preparation 1

The solid content (DRC) of natural rubber latex was adjusted to 30% (w/v). Then, 10 g of Emal-E27C and 20 g of NaOH were added to 1000 g of the natural rubber latex, and the mixture was subjected to saponification at room temperature for 48 hours, whereby a saponified natural rubber latex was prepared. The saponified latex was diluted with water so that the DRC was adjusted to 15% (w/v). Then, formic acid was added to the diluted latex with slow stirring so that the pH was adjusted to 4.0 to 4.5. After that, 1 g of the polymeric coagulant in the form of a 0.1% solution was added to the latex with stirring, so that the latex was coagulated. Then, the coagulated rubber was broken up and repeatedly washed with 1000 mL of water 3 times. The resultant rubber was dried for 2 hours at 110° C., whereby a solid rubber (highly purified natural rubber 1) was obtained.

Preparation 2

A solid rubber (highly purified natural rubber 2) was obtained in the same manner as in Preparation 1, except that the amount of NaOH was 30 g and the washing was repeated 5 times.

The solid rubbers obtained in Preparations 1 and 2 (highly purified natural rubbers 1 and 2) and natural rubber (TSR20) were measured for the nitrogen content, phosphorus content, and gel content using the below mentioned methods. Table 1 shows the results.

(Determination of Nitrogen Content)

The nitrogen content was determined with CHN CORDER MT-5 (produced by Yanaco Analytical Instruments Corp.). In the determination, first, a calibration curve for determining the nitrogen content was prepared with antipyrine taken as a reference material. Then, an about 10 mg sample was weighed out and measured. An average value from three measurements was taken as the nitrogen content of the sample.

(Determination of Phosphorus Content)

The phosphorus content of a sample was determined with an ICP optical emission spectrometer (ICPS-8100, produced by Shimadzu Corp.).

Additionally, $^{31}$P-NMR measurement of phosphorus was performed as follows. A chloroform extract from the raw rubber was purified and then dissolved in $CDCl_3$ to prepare a test sample. The test sample was analyzed using an NMR spectrometer (400 MHz, AV400M, produced by Bruker Japan Co., Ltd.) with the standard (0 ppm) that was defined as the determined peak attributed to the P atom of an 80% phosphoric acid aqueous solution.

(Determination of Gel Content)

70.00 mg of a raw rubber sample cut into a size of 1 mm×1 mm was weighed and mixed with 35 mL of toluene, and the mixture was allowed to stand still for one week in a cool and dark place. Then, the resulting mixture was centrifuged so that a toluene-insoluble gel fraction was precipitated, and a toluene-soluble supernatant was then removed. Then, the gel fraction alone was solidified with methanol and dried. The mass of the dried gel fraction was measured, and then used in the following formula to determine the gel content (% by mass).

Gel content (% by mass)=[Mass (mg) of dried gel fraction]/[Mass (mg) of original sample]×100

TABLE 1

|  | Phosphorus content (ppm) | Gel content (% by mass) | Nitrogen content (% by mass) |
|---|---|---|---|
| Highly purified natural rubber 1 | 167 | 7.8 | 0.19 |
| Highly purified natural rubber 2 | 124 | 4.7 | 0.08 |
| Natural rubber (TSR20) | 602 | 29.8 | 0.36 |

As shown in Table 1, the highly purified natural rubbers 1 and 2 had reduced nitrogen, phosphorus, and gel contents, compared with TSR. Also, in $^{31}$P-NMR measurement, the highly purified natural rubbers 1 and 2 showed no peak attributed to phospholipids in a range of −3 ppm to 1 ppm.

In the following, the chemical agents used in Examples and Comparative Examples were listed.

Highly purified natural rubber 1: see Preparation 1
Highly purified natural rubber 2: see Preparation 2
Natural rubber: TSR20
Butadiene rubber: BR150L produced by Ube industries, Ltd.
Carbon blacks A to F: see Table 2
Zinc oxide: product of Mitsubishi Chemical Corporation
Stearic acid: product of NOF Corporation
Antioxidant: Ozonone 6C (N-(1,3-dimethylbutyl)-N'-phenyl-p-phenylenediamine) produced by Seiko Chemical Co., Ltd.
Wax: Ozoace 0355 produced by Nippon Seiro Co., Ltd.
Sulfur: powder sulfur produced by Nippon Kanryu Industry Co., Ltd.
Vulcanization accelerator: Nocceler NS (N-tert-butyl-2-benzothiazolylsulfenamide) produced by Ouchi Shinko Chemical Industrial Co., Ltd.

Table 2 shows properties of carbon blacks A to F.

TABLE 2

|  | IA (mg/g) | CTAB (m²/g) | CTAB/IA (m²/mg) | Dst (nm) | ΔD50 (nm) | ΔD50/Dst | Light transmittance of toluene extract (%) |
|---|---|---|---|---|---|---|---|
| Carbon black A | 148 | 141 | 0.95 | 60 | 46 | 0.77 | 89 |
| Carbon black B | 146 | 138 | 0.95 | 63 | 50 | 0.8 | 90 |
| Carbon black C | 164 | 161 | 0.98 | 65 | 60 | 0.93 | 96 |
| Carbon black D | 159 | 160 | 1.01 | 62 | 53 | 0.86 | 100 |
| Carbon black E | 164 | 145 | 0.88 | 62 | 57 | 0.92 | 96 |
| Carbon black F | 160 | 154 | 0.96 | 60 | 55 | 0.91 | 88 |

Examples and Comparative Examples

Materials in amounts shown in Table 3, other than the sulfur and vulcanization accelerator, were mixed. The mixture was kneaded using a Banbury mixer for 4 minutes up to 150° C., whereby a kneaded mixture was prepared. Then, the sulfur and vulcanization accelerator were added to the kneaded mixture and they were kneaded using an open two-roll mill at 40° C. for 4 minutes to give an unvulcanized rubber composition. The unvulcanized rubber composition was then press-vulcanized at 150° C. for 30 minutes to form a vulcanized rubber composition.

Also, the thus obtained unvulcanized rubber composition was formed into the shape of a tread, assembled with other tire components and vulcanized at 150° C. and 20 kgf for 45 minutes, whereby a test heavy duty tire (tire size: 11R22.5) was prepared.

The prepared vulcanized rubber compositions and test tires were subjected to the following evaluations. Table 3 shows the results.

(Low Severity Abrasion Test)

Test samples were prepared from the vulcanized rubber compositions. The samples were measured using a Lambourn abrasion tester (produced by Iwamoto Seisakusho) at a surface rotational speed of 80 m/min, a load of 3.0 kg, a slip rate of 20%, an amount of falling sands of 15 g/min, and a measurement time of 3 minutes so as to determine the volume loss of each formulation. The volume loss of each formulation was expressed as a low-severity abrasion index based on the following formula with the volume loss of Comparative Example 1 as 100. A larger low-severity abrasion index indicates better abrasion resistance under low severity abrasion conditions.

(Low-severity abrasion index)=(Volume loss of Comparative Example 1 under low severity abrasion conditions)/(Volume loss of each formulation under low severity abrasion conditions)×100

(High Severity Abrasion Test)

Test samples were prepared from the vulcanized rubber compositions. The samples were measured using a Lambourn abrasion tester (produced by Iwamoto Seisakusho) at a surface rotational speed of 80 m/min, a load of 3.0 kg, a slip rate of 40%, an amount of falling sands of 15 g/min, and a measurement time of 3 minutes so as to determine the volume loss of each formulation. The volume loss of each formulation was expresses as a high-severity abrasion index based on the following formula with the volume loss of Comparative Example 1 as 100. A larger high-severity abrasion index indicates better abrasion resistance under high severity abrasion conditions.

(High-severity abrasion index)=(Volume loss of Comparative Example 1 under high severity abrasion conditions)/(Volume loss of each formulation under high severity abrasion conditions)×100

(Viscoelasticity Test)

A test sample (width: 4 mm, thickness: 1.8 to 2.2 mm, length: 30 mm) was cut from the tread of each test tire. The test sample was measured for the loss tangent (tan δ) using a viscoelasticity spectrometer VES (produced by Iwamoto Seisakusho) at 70° C., a frequency of 10 Hz, an initial strain of 10%, and a dynamic strain of 2%. A smaller tan δ value indicates lower heat build-up which can contribute to better fuel economy.

(Tensile Test)

A test sample (width: 25 mm, thickness: 2 mm, length: 100 mm) was cut from the tread of each test tire and was subjected to heat aging at 80° C. for 10 days in a geer oven. Then, the tensile strength at break (TB) and elongation at break (EB) of each test tire were measured in accordance with JIS K6251 "Rubber, vulcanized or thermoplastic—Determination of tensile stress-strain properties", and the product thereof (TB×EB) was calculated. The TB×EB of each formulation was expressed as a chipping resistance index based on the following formula with the TB×EB of Comparative Example 1 as 100. A larger chipping resistance index indicates better chipping resistance.

(Chipping resistance index)=[(*TB*×*EB*) of each formulation)]/[(*TB*×*EB*) of Comparative Example 1]×100

TABLE 3

|  |  | Examples | | | | | | | | | |
|---|---|---|---|---|---|---|---|---|---|---|---|
|  |  | 1 | 2 | 3 | 4 | 5 | 6 | 7 | 8 | 9 | 10 |
| Formulation (part(s) by mass) | Highly purified natural rubber 1 | 80 | 80 | 60 | 40 | 90 | 70 | 50 | 30 | | |
|  | Highly purified natural rubber 2 | | | | | | | | | 80 | 80 |
|  | Natural rubber (TSR20) | | | 20 | 40 | | | 20 | 40 | | |
|  | Butadiene rubber (BR150) | 20 | 20 | 20 | 20 | 10 | 30 | 30 | 30 | 20 | 20 |
|  | Carbon black A | | | | | | | | | | |
|  | Carbon black B | | | | | | | | | | |
|  | Carbon black C | | | | | | | | | | |
|  | Carbon black D | | | | | | | | | | |
|  | Carbon black E | 50 | | 50 | 50 | 50 | 50 | 50 | 50 | 50 | |
|  | Carbon black F | | 50 | | | | | | | | 50 |
|  | Zinc oxide | 3 | 3 | 3 | 3 | 3 | 3 | 3 | 3 | 3 | 3 |
|  | Stearic acid | 4 | 4 | 4 | 4 | 4 | 4 | 4 | 4 | 4 | 4 |
|  | Antioxidant | 2 | 2 | 2 | 2 | 2 | 2 | 2 | 2 | 2 | 2 |
|  | Wax | 1.5 | 1.5 | 1.5 | 1.5 | 1.5 | 1.5 | 1.5 | 1.5 | 1.5 | 1.5 |
|  | Sulfur | 0.8 | 0.8 | 0.8 | 0.8 | 0.8 | 0.8 | 0.8 | 0.8 | 0.8 | 0.8 |
|  | Vulcanization accelerator | 1.5 | 1.5 | 1.5 | 1.5 | 1.5 | 1.5 | 1.5 | 1.5 | 1.5 | 1.5 |
| Amount (% by mass) of natural rubber component in rubber component ((Highly purified natural rubbers 1 + 2 + Natural rubber)/Rubber component × 100) | | 80 | 80 | 80 | 80 | 90 | 70 | 70 | 70 | 80 | 80 |
| Amount (% by mass) of highly purified natural rubber in natural rubber component ((Highly purified natural rubbers 1 + 2)/(Highly purified natural rubbers 1 + 2 + Natural rubber) × 100) | | 100 | 100 | 75 | 50 | 100 | 100 | 71 | 43 | 100 | 100 |
| Evaluation | Low-severity abrasion index | 110 | 112 | 111 | 108 | 112 | 107 | 105 | 103 | 112 | 114 |
|  | High-severity abrasion index | 110 | 111 | 108 | 107 | 113 | 111 | 106 | 105 | 111 | 111 |
|  | tanδ | 0.121 | 0.122 | 0.124 | 0.126 | 0.119 | 0.125 | 0.127 | 0.129 | 0.119 | 0.118 |
|  | Chipping resistance index | 105 | 108 | 105 | 103 | 107 | 104 | 104 | 102 | 107 | 108 |

|  |  | Comparative Examples | | | | | | |
|---|---|---|---|---|---|---|---|---|
|  |  | 1 | 2 | 3 | 4 | 5 | 6 | 7 |
| Formulation (part(s) by mass) | Highly purified natural rubber 1 | | | 80 | 80 | 80 | 80 | |
|  | Highly purified natural rubber 2 | | | | | | | |
|  | Natural rubber (TSR20) | 80 | 80 | | | | | 80 |
|  | Butadiene rubber (BR150) | 20 | 20 | 20 | 20 | 20 | 20 | 20 |
|  | Carbon black A | | | 50 | | | | 50 |
|  | Carbon black B | | | | 50 | | | |
|  | Carbon black C | | | | | 50 | | |
|  | Carbon black D | | | | | | 50 | |
|  | Carbon black E | 50 | | | | | | |
|  | Carbon black F | | 50 | | | | | |
|  | Zinc oxide | 3 | 3 | 3 | 3 | 3 | 3 | 3 |
|  | Stearic acid | 4 | 4 | 4 | 4 | 4 | 4 | 4 |
|  | Antioxidant | 2 | 2 | 2 | 2 | 2 | 2 | 2 |
|  | Wax | 1.5 | 1.5 | 1.5 | 1.5 | 1.5 | 1.5 | 1.5 |
|  | Sulfur | 0.8 | 0.8 | 0.8 | 0.8 | 0.8 | 0.8 | 0.8 |
|  | Vulcanization accelerator | 1.5 | 1.5 | 1.5 | 1.5 | 1.5 | 1.5 | 1.5 |
| Amount (% by mass) of natural rubber component in rubber component ((Highly purified natural rubbers 1 + 2 + Natural rubber)/Rubber component × 100) | | 80 | 80 | 80 | 80 | 80 | 80 | 80 |
| Amount (% by mass) of highly purified natural rubber in natural rubber component ((Highly purified natural rubbers 1 + 2)/(Highly purified natural rubbers 1 + 2 + Natural rubber) × 100) | | 0 | 0 | 100 | 100 | 100 | 100 | 0 |
| Evaluation | Low-severity abrasion index | 100 | 103 | 102 | 103 | 102 | 102 | 101 |
|  | High-severity abrasion index | 100 | 102 | 103 | 104 | 103 | 103 | 102 |
|  | tanδ | 0.131 | 0.132 | 0.122 | 0.124 | 0.125 | 0.123 | 0.138 |
|  | Chipping resistance index | 100 | 101 | 90 | 95 | 97 | 94 | 88 |

In Examples in which the specific carbon black and highly purified natural rubber were used, a balanced improvement in the abrasion resistance under both low severity abrasion conditions and high severity abrasion conditions, low heat build-up properties, and chipping resistance was exhibited. On the other hand, in Comparative Example 3 in which carbon black A having a ΔD50/Dst outside the predetermined range was used, poor chipping resistance was exhibited. In Comparative Example 5 in which carbon black C having a CTAB outside the predetermined range was used, the above properties were inferior. In particular, when comparing the results of Comparative Examples 1, 3 and 7 with those of Example 1, it is demonstrated that combination use of the specific carbon black and the modified natural rubber in the present invention can improve the above properties synergistically.

The invention claimed is:

1. A heavy duty tire having a tire component formed from a rubber composition for a tire, comprising:
    a rubber component containing 60% by mass or more of a natural rubber component; and
    a carbon black having a cetyltrimethylammonium bromide (CTAB) specific surface area of 140 to 160 m$^2$/g, a ratio (CTAB/IA) of the cetyltrimethylammonium bromide specific surface area to an iodine adsorption number (IA) of 0.85 to 1 m$^2$/mg, and a ratio (ΔD50/Dst) of a half width (ΔD50) of Stokes' diameter distribution of aggregates to a Stokes' diameter (Dst) of aggregates, as determined by a centrifugal sedimentation method, of 0.9 to 0.99,
    the natural rubber component containing 20% by mass or more of highly purified natural rubber per 100% by mass of the natural rubber component.

2. The heavy duty tire according to claim 1, wherein the rubber composition contains sulfur in an amount of 0.6 to 1 part by mass per 100 parts by mass of the rubber component.

3. The heavy duty tire according to claim 1, wherein the highly purified natural rubber has a phosphorus content of 200 ppm or less.

4. The heavy duty tire according to claim 1, wherein the highly purified natural rubber has a nitrogen content of 0.3% by mass or less.

5. The heavy duty tire according to claim 1, wherein the carbon black is contained in an amount of 40 to 60 parts by mass per 100 parts by mass of the rubber component.

6. The heavy duty tire according to claim 1, wherein the rubber composition further comprises 5 to 40% by mass of a butadiene rubber in 100% by mass of the rubber component.

* * * * *